Figure 4:
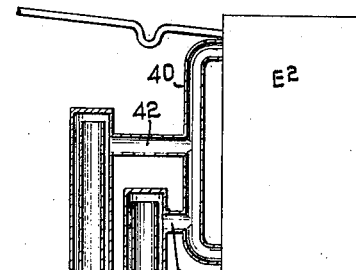

Oct. 24, 1944. E. W. WIESE 2,361,075
ABSORPTION REFRIGERATORS OF THE CONTINUOUS TYPE
Filed April 26, 1941 3 Sheets-Sheet 1
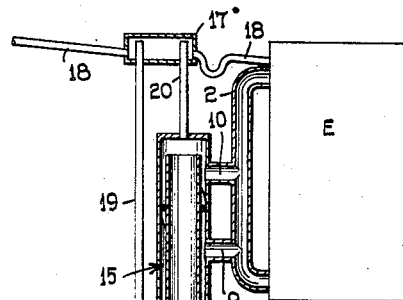
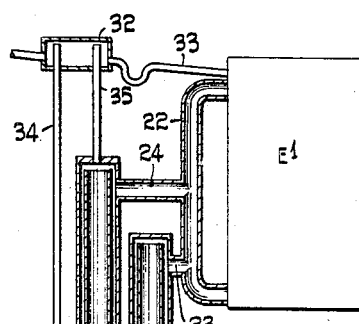
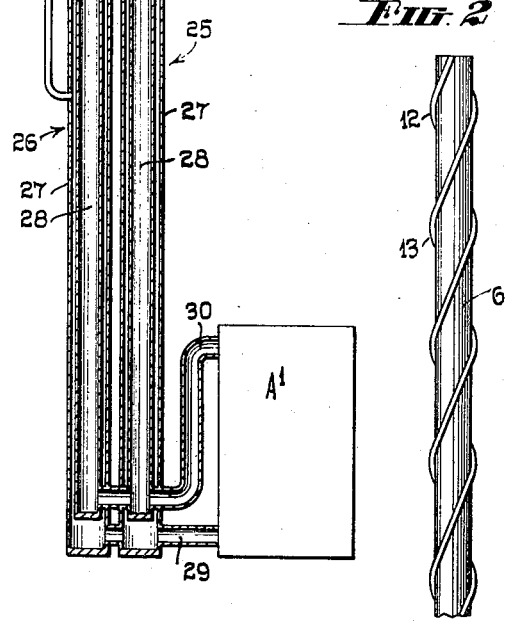
Inventor:
Eric Wilfred Wiese, Oct. 24, 1944.  E. W. WIESE  2,361,075
ABSORPTION REFRIGERATORS OF THE CONTINUOUS TYPE
Filed April 26, 1941  3 Sheets-Sheet 2

Inventor:
Eric Wilfred Wiese,
By Wilkinson, Huxley, Byron & Knight
attys

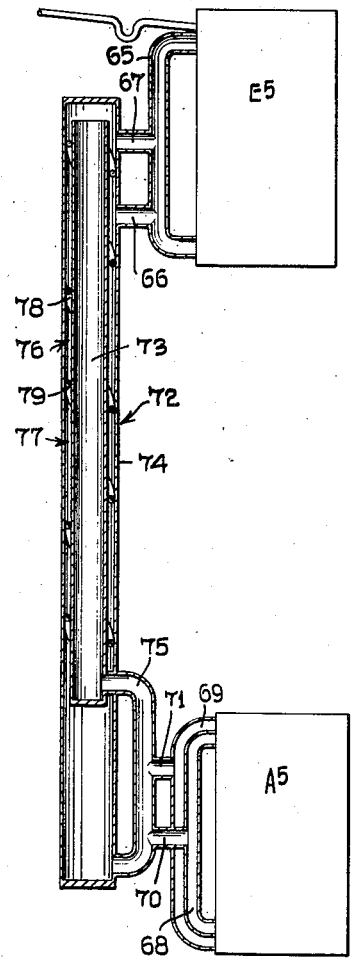

Patented Oct. 24, 1944

2,361,075

UNITED STATES PATENT OFFICE 2,361,075

ABSORPTION REFRIGERATOR OF THE CONTINUOUS TYPE

Eric Wilfred Wiese, Lower North Adelaide, South Australia, Australia, assignor to William Queale, Glen Osmond, Australia Application April 26, 1941, Serial No. 390,509
In Australia July 15, 1940

10 Claims. (Cl. 62—119.5)

This invention relates to improvements in absorption refrigerators and in particular it relates to refrigerators of the type wherein continuous circulation is maintained by using a gas (inert to the refrigerant) as well as a refrigerant to enable varying partial pressures to be obtained throughout the circuit while maintaining a substantially uniform absolute pressure.

In apparatus of this type it is customary to utilise a boiler in which a refrigerant vapour such as ammonia is expelled, a condenser in which the vapours are liquefied, an evaporator in which heat is absorbed from the surroundings due to the vaporisation of the liquid refrigerant, and an absorber in which the refrigerant vapour is again absorbed into a liquid to be passed into the boiler for re-expulsion. In a unit of this type it is desirable to obtain effective circulation of the refrigerant in the evaporator and absorber to ensure that both of these units will function at the required efficiency and for this reason it has been proposed to circulate the refrigerant vapour and the hydrogen or other gas from the evaporator to the absorber and back to the evaporator.

While it is relatively simple to ensure an efficient circulation between absorber and evaporator a difficulty exists in that the absorber is at a higher temperature than the evaporator and therefore unless due precautions are taken, the circulation of the refrigerant vapour and the gas will carry over considerable quantities of heat from the absorber to the evaporator and thus will seriously decrease the cooling capacity of such evaporator.

Various methods have been proposed for reducing the heat exchange between absorber and evaporator, such as the cooling of the gas and vapour by a heat exchange between the gas flowing to the evaporator and the refrigerant flowing from same. According to a known method the evaporator is provided with a by-pass arranged between two levels thereof in such a manner that circulation obtains therein independently of circulation in the absorber, the absorber also being provided with a by-pass whereby said absorber and said by-pass provide a circulatory system, both of these independent circulatory systems being interconnected by a tube through which, by diffusion, the refrigerant passes. By use of this arrangement, there is no open circulation between the absorber and evaporator and consequently there is a very much lower heat transfer between such units, the efficiency of circulation in the evaporator and the absorber being maintained by reason of the independent circulatory systems embodied in same. In an arrangement of this type some limit is placed on the effectiveness of the units by the difference in partial pressure of the refrigerant between the ends of the diffusion tube which is necessary for diffusion to take place.

It is an object of this invention to reduce the difference in partial pressure between the evaporator and the absorber and consequently the temperature. It is a further object to provide an improved circulatory system which will permit an effective flow of the vapour from the evaporator to the absorber but in which the amount of heat passed from the absorber to the evaporator will be kept within correct limits.

According to my invention the evaporator and the absorber are each embodied in an independent circulatory system much as heretofore but instead of these systems being interconnected by a single diffusion tube they are interconnected to have a multiplicity of diffusion points so arranged that the circulation of the gas past same will be correctly maintained.

Figure 5:
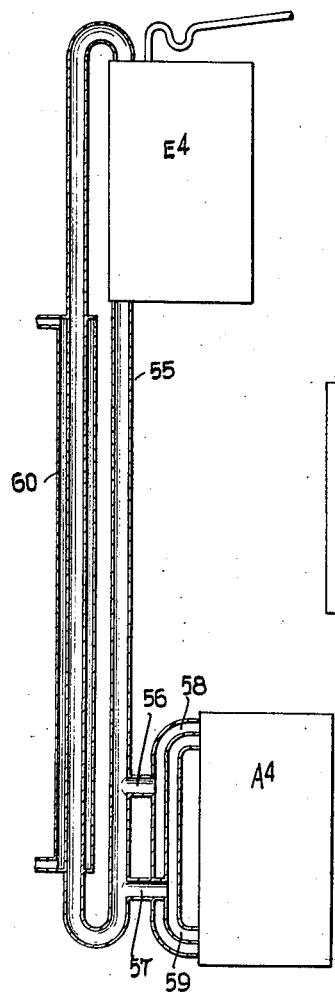

So that the invention will be more clearly understood various embodiments of same will now be described with reference to the accompanying drawings in which:

Fig. 1 is a somewhat diagrammatic view showing the invention applied between an evaporator and an absorber, the view being partly in section, Fig. 2 is an outside view of the central tube of the heat exchanger shown in Fig. 1 showing the helical members which form the two channels later referred to herein, Fig. 3 is a view corresponding to Fig. 1 but showing the invention arranged with two heat interchangers, Fig. 4 is a similar view to Fig. 3 but showing two absorbers, Fig. 5 shows the diffusion points associated directly with the absorber, and Fig. 6 shows an evaporator and absorber each with its own by-pass conduit whereby each is embodied in an independent circulatory system, which systems are interconnected through an auxiliary circulatory conduit.

Referring first to the embodiment shown in Figs. 1 and 2, the evaporator E is provided with a circulatory tube or by-pass 2 to permit independent circulation to take place through the evaporator. The absorber A is likewise provided with an independent by-pass which in this case comprises a heat exchanger 4 composed of an outer tube 5 and an inner tube 6, the inner tube 6 being connected at its lower end by a tube 7 with the absorber, and the outer tube 5 being also connected with the absorber by a tube 8. The circulation from the absorber is thus through the tube 7 and up the inner tube 6 thence over the top of same and down between the tubes 5 and 6 and back to the absorber through the connecting tube 8.

Two diffusion points 9 and 10 place the tube 2 into communication with the outer tube 5 of the heat exchanger 4, the diffusion point 9 being located in the lower part of the tube 2, and the diffusion point 10 being located at about the centre of such tube. The purpose of locating the diffusion points 9 and 10 as indicated is to ensure that the refrigerant vapour pressure in the circulatory tube or by-pass 2 of the circulatory system of the evaporator will be continuously reduced so as to cause an effective circulation and a higher degree of diffusion to take place than was possible heretofore.

Each of the diffusion points 9 and 10 communicates with a separate channel in the heat exchanger, such channels being formed by locating two helical wires 12 and 13 around the inner tube 6, the space between the outer tube 5 and the inner tube 6 being thus divided into two channels 14 and 15, the channel 14 being in communication with the diffusion point 9 and the channel 15 being in communication with the diffusion point 10.

In operation, using an appropriate refrigerant and inert gas such as ammonia and hydrogen, there will be a rising vapour column in the evaporator circulatory tube or by-pass 2 which column is successively reduced in refrigerant partial pressure at each diffusion point, while the refrigerant vapours which enter the absorber circulatory system due to the diffusion will cause a downward circulation in each of the respective channels 14 and 15 with which the diffusion points are connected.

By using an inert gas heavier than the refrigerant the circulation could be reversed.

As the several diffusion points usually have a different vapour pressure, the lowermost diffusion point 9 having the greater transfer, the vapour column in the absorber channel 14 will have a greater weight than the vapour column in the channel 15. As the channels 14 and 15 of the absorber circulatory system are normally in intercommunication at their intake and outlet ends it is possible that under some conditions an automatic circulation might be set up within such channels independently of the general circulation through the absorber. To counteract this the channels may be provided with restricters, for instance the channel 14 may be restricted in cross-sectional area to limit the rate of fall of the vapour and gas therein, but we usually prefer to prevent this unwanted automatic circulation by means of a gas balancer as illustrated in the drawings.

According to this a small vaporising chamber 17 in the refrigerant line 18 to the evaporator is provided with a bleeder tube 19 which is arranged to feed refrigerant vapour into the channel 15 at some point intermediate its ends. A small tube 20 connects the top of the heat exchanger 4 with the vaporising chamber 17 to permit a circulation of the inert gas from the heat exchanger to the vaporising chamber 17 to compensate for the inert gas which flows down the tube 19 with the refrigerant vapour. In this way by a correct proportioning of the quantities of refrigerant fed to the channel 15 the vapour pressure within same can be so adjusted that the two falling columns are given the same weight, ensuring that the correct circulation of the falling columns in the channels 14 and 15 is attained.

From the foregoing it will be realized that according to this invention the plurality of diffusion points in the evaporator circulatory system are arranged along such circulatory system and that each diffusion point communicates with a separate channel, in a circulatory system in which absorber fluid circulates. The absorber gas enters each of the channels at the same refrigerant partial pressure so that each of the diffusion points is on one side in communication with gas at the absorber partial pressure and on the other side is in communication with gas at a falling partial pressure, depending upon the position of the diffusion point in relation to the circulation of the refrigerant gas in the evaporator circulatory system.

By means of this system it is possible to bring the refrigerant partial pressure in the evaporator circulatory system down to a point very close to the lowest partial refrigerant pressure obtaining in the absorber circulatory system, namely that obtaining at the inlet to the channels. That this is so can be seen if it is considered that the refrigerant partial pressure at the first diffusion point is the sum of the pressures on each side of the point over two. The refrigerant partial pressure at the next diffusion point is the reduced pressure in the evaporator circulatory system plus the pressure in its channel over two, which is a figure lower than the figure at the first diffusion point, each added diffusion point lowering the refrigerant partial pressure in the evaporator circulatory system because at every point the pressure on the outer side, namely the channel side, remains the same owing to each of the channels being fed from the common source.

Referring now to the embodiment shown in Fig. 3, in this the evaporator E1 is provided with a circulatory tube or by-pass 22 and with two diffusion points 23 and 24 each communicating with an independent heat exchanger, the heat exchangers being designated 25 and 26 respectively.

The heat exchangers 25 and 26 each comprise an outer tube 27 and an inner tube 28, the outer tubes 27 being connected by a common tube 29 with the absorber A1 and the inner tubes 28 being also interconnected with the absorber A1 by a tube 30.

A gas balancer similar to that described with reference to Fig. 1 is provided, this balancer comprising a vaporising chamber 32 in the refrigerant line 33, a bleeder tube 34 and a tube 35 (corresponding to the tubes 19 and 20) providing the necessary circulatory path for the gases.

According to the embodiment shown in Fig. 4 the evaporator E2 is provided with a circulatory tube or by-pass 40 having two diffusion points 41 and 42 communicating respectively with heat exchangers 43 and 44. The inner tube 45 of the heat exchanger 43 is connected by means of a tube 46 with the absorber A2 while the outer tube 47 is also connected by means of a tube 48 with the absorber A2. The inner tube 49 of the heat exchanger 44 is connected by means of a tube 50 with the absorber A3, while the outer tube 51 is also connected with the absorber A3 by a tube 52. According to this modification the two absorbers ensure that the evaporator E2 will operate at high capacity, the two diffusion points 41 and 42 ensuring an effective circulation through the evaporator by drawing off the required quantities of refrigerant vapour from the circulatory tube 40.

According to the embodiment shown in Fig. 5 the evaporator E4 is provided with a depending circulatory tube 55 which has associated with it a pair of diffusion points 56 and 57, the diffusion point 56 communicating with a circulation channel 58 of the absorber A4, and the diffusion point 57 communicating with a circulation channel 59 also associated with the absorber A4.

Fig. 5 shows a cooling jacket 60 through which an auxiliary cooling medium may be circulated to reduce the temperature of the rising gas column in the circulatory tube 55.

According to the modification shown in Fig. 6 the evaporator E5 is provided with a circulatory tube 65 which has two diffusion points 66 and 67. The absorber A5 is also provided with a bypass which in this case comprises circulation channels 68 and 69. The channel 68 communicates with a diffusion point 70 while the channel 69 communicates with a diffusion point 71.

The diffusion points 66 and 67, as well as the diffusion points 70 and 71, communicate with an auxiliary circuit which is arranged in the form of a heat exchanger 72 comprising an inner tube 73 and an outer tube 74. The lower part of the inner tube 73 is connected with the lower part of the outer tube 74 by means of a circulatory tube 75 with which the diffusion points 70 and 71 communicate, the top of the inner tube 73 opening into the top of the outer tube 74.

The space between the inner tube 73 and the outer tube 74 is divided into two channels 76 and 77, the channel 76 communicating with the diffusion point 66, and the channel 77 communicating with the diffusion point 67. The channels are formed by locating a pair of helical wires 78 and 79 between the inner tube 73 and the outer tube 74.

To provide a form of gas balancer to prevent automatic circulation between the channels 76 and 77 the channel 76 which communicates with the first diffusion point 66 (which normally has the greater diffusion) is of smaller dimension than the channel 77 which communicates with the second diffusion point 67, this restricting the flow in the channel 76 and providing correct balance. This form of gas balancer may replace or be replaced by the form shown in Figs. 1 and 3.

According to the system just described gas circulates in the heat exchanger as it would in the case shown in Fig. 1. The function of the diffusion points 66 and 67 is again identical with that described with reference to Fig. 1, the object being to lower the partial refrigerant pressure in the auxiliary heat exchanger circuit without an interchange of inert gas at different temperatures.

What I claim is:

1. In absorption refrigerators of the continuous type, the combination with an evaporator and an absorber, of a by-pass for the evaporator comprising a tube joining spaced sections of the evaporator whereby said evaporator and said by-pass form an evaporator circulatory system, a by-pass for the absorber whereby said absorber and its by-pass form an absorber circulatory system, said last mentioned by-pass including a plurality of parallel channels, and a connection between the tube and each said channel to provide diffusion points, thereby promoting diffusion of the refrigerant from the evaporator into the absorber circulatory system.

2. In absorption refrigerators as claimed in claim 1, said channels communicating with each other at their intake and outlet ends, and said channels having different cross sectional area to prevent circulation between the channels independently of general circulation through the absorber.

3. In absorption refrigerators of the continuous type, the combination with an evaporator and an absorber, of a by-pass for the evaporator comprising an exterior tube joining spaced sections of the evaporator whereby said evaporator and said by-pass provide an evaporator circulatory system, a by-pass for the absorber whereby said absorber and its by-pass provide a circulatory system, said last mentioned by-pass including a plurality of parallel channels and a connection between the tube and each said channel to provide diffusion points, said connections placing each channel into communication with a different point in the evaporator circulatory system, thereby promoting diffusion of the refrigerant from the evaporator into the absorber circulatory system.

4. In absorption refrigerators as claimed in claim 3, wherein an auxiliary vapor supply means has connection with one of said channels intermediate the ends thereof to render the flow through said channels substantially uniform, thereby compensating for the different diffusion rates at the different diffusion points.

5. In absorption refrigerators of the continuous type, the combination with an evaporator and an absorber, of a by-pass for the evaporator comprising an exterior tube joining spaced sections of the evaporator whereby said evaporator and said by-pass provide an evaporator circulatory system, a by-pass for the absorber including concentrically arranged pipes forming a heat exchanger, said absorber and its corresponding by-pass providing an absorber circulatory system, helical members located between the pipes to form the annular space into a plurality of separate channels, and a connection between the tube and each said channel to provide diffusion points, thereby promoting diffusion of the refrigerant from the evaporator into the absorber circulatory system.

6. In absorption refrigerators of the continuous type, the combination of an evaporator and an absorber, of a by-pass for the evaporator comprising a vertically disposed exterior tube joining the spaced sections of the evaporator whereby said evaporator and its by-pass provide an evaporator circulatory system, a by-pass for the absorber including concentrically arranged pipes forming a heat exchanger whereby said absorber and its by-pass provide an absorber circulatory system, helical members located between the pipes to form the annular space into a plurality of separate channels, and a connection between the tube and each said channel to provide diffusion points, said connections placing each channel into communication with the evaporator circulatory system at a different height along said vertically disposed tube, thereby promoting diffusion of the refrigerant from the evaporator into the absorber circulatory system.

7. In absorption refrigerators as claimed in claim 6, wherein an auxiliary vapor supply means has connection with one of said channels intermediate the ends thereof to render the flow through the channels substantially uniform, thereby compensating for the different diffusion rates at the different diffusion points.

8. In absorption refrigerators as claimed in claim 6, said channels communicating with each other at their intake and outlet ends, and said channels having different cross sectional area to prevent circulation between the channels independently of general circulation through the absorber.

9. In absorption refrigerators of the continuous type, the combination with an evaporator and an absorber, of a by-pass for the evaporator including an exterior tube joining spaced sections of the evaporator, said evaporator and said by-pass providing an evaporator circulatory system, a by-pass for the absorber comprising concentrically arranged pipes forming a heat exchanger, said absorber and its corresponding by-pass providing an absorber circulatory system, said pipes at one end of the heat exchanger having individual connection with the absorber, the inner pipe having its opposite end open to communicate with the interior of the outer pipe, whereby the interior pipe provides a part of the circulatory system of the absorber and the annular space between said pipes provides another part of said system, means within the annular space forming a plurality of separate channels, and connections between the tube and the outer pipe having communication with said channels, respectively, whereby diffusion points are provided to promote diffusion of the refrigerant from the evaporator into the absorber circulatory system.

10. In absorption refrigerators of the continuous type, the combination with an evaporator and an absorber, of a by-pass for the evaporator comprising an exterior tube joining spaced sections of the evaporator whereby said evaporator and said by-pass provide an evaporator circulatory system by-pass means for the absorber including a plurality of channels providing with said absorber an absorber circulatory system, a heat exchanger providing a connecting conduit and including an inner pipe open at its end adjacent the evaporator and a concentric outer pipe completely enclosing the inner pipe, a plurality of helical members located between the pipes to form the annular space into a plurality of channels, connections between the tube and the heat exchanger to provide diffusion points, said connections placing each channel of the heat exchanger into communication with a different point in the evaporator circulatory system, and other connections between the heat exchanger and the absorber circulatory system, said other connections joining the inner pipe with one channel of said absorber circulatory system and joining the outer pipe with another channel of said system.

ERIC WILFRED WIESE.